(12) United States Patent
Ghabra

(10) Patent No.: US 11,094,150 B2
(45) Date of Patent: Aug. 17, 2021

(54) VEHICLE CONTROLLED POLLING REDUCTION AT MOBILE DEVICE BASED ON MOTION STATUS REPORTED BY MOBILE DEVICE

(71) Applicants: DENSO International America, Inc., Southfield, MI (US); DENSO CORPORATION, Kariya (JP)

(72) Inventor: Riad Ghabra, Northville, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/734,772

(22) Filed: Jan. 6, 2020

(65) Prior Publication Data
US 2021/0209873 A1 Jul. 8, 2021

(51) Int. Cl.
*G07C 9/00* (2020.01)
*G06F 9/4401* (2018.01)
*H04W 4/40* (2018.01)
*H04W 4/029* (2018.01)

(52) U.S. Cl.
CPC ....... *G07C 9/00174* (2013.01); *G06F 9/4418* (2013.01); *H04W 4/029* (2018.02); *H04W 4/40* (2018.02); *G07C 2009/00769* (2013.01)

(58) Field of Classification Search
CPC .................................................. G07C 9/001
See application file for complete search history.

(56) References Cited

U.S. PATENT DOCUMENTS

| | | | |
|---|---|---|---|
| 9,688,247 B1 | 6/2017 | Jayaraman et al. | |
| 9,794,753 B1 | 10/2017 | Stitt et al. | |
| 9,830,485 B1 * | 11/2017 | Lecky | G06Q 10/0875 |
| 9,860,297 B2 * | 1/2018 | Palin | H04L 65/80 |
| 9,894,492 B1 * | 2/2018 | Elangovan | H04W 4/023 |
| 9,984,556 B1 * | 5/2018 | Knas | G01C 21/206 |
| 10,002,479 B2 | 6/2018 | Oz et al. | |
| 10,244,476 B2 | 3/2019 | Elangovan et al. | |
| 10,328,898 B2 | 6/2019 | Golsch et al. | |

(Continued)

FOREIGN PATENT DOCUMENTS

| | | | |
|---|---|---|---|
| BR | 102014017465 A2 | 2/2016 | |
| CN | 104574593 A | 4/2015 | |

(Continued)

*Primary Examiner* — K. Wong
(74) *Attorney, Agent, or Firm* — Harness, Dickey & Pierce, P.L.C.

(57) ABSTRACT

A mobile device is provided and includes a sensor and a control module. The sensor is configured to detect movement of the mobile device. The control module is configured to: based on an output of the sensor, determine whether the mobile device is moving; when the mobile device is moving, transmit via a transceiver at least one signal to a vehicle indicating movement of the mobile device and an indication of presence of the mobile device; based on the at least one signal, receive an instruction signal or an information signal from the vehicle via the transceiver; based on the instruction signal or an information signal, at least one of reduce a polling rate of the mobile device, cease to indicate presence of the mobile device or transition to a sleep mode; and transition from the sleep mode to an awake mode in response to movement of the mobile device.

22 Claims, 7 Drawing Sheets

(56) References Cited

U.S. PATENT DOCUMENTS

| | | |
|---|---|---|
| 10,328,899 B2 | 6/2019 | Golsch |
| 10,328,900 B1 | 6/2019 | Yakovenko et al. |
| 10,524,090 B2 * | 12/2019 | Hollinger ............ H04W 68/005 |
| 10,805,794 B2 * | 10/2020 | Patterson ................ H04W 4/80 |
| 2002/0025823 A1 | 2/2002 | Hara |
| 2011/0215921 A1 | 9/2011 | Ben Ayed et al. |
| 2012/0045058 A1 | 2/2012 | Weghaus |
| 2014/0274013 A1 | 9/2014 | Santavicca |
| 2015/0148989 A1 | 5/2015 | Cooper et al. |
| 2015/0161832 A1 | 6/2015 | Esselink et al. |
| 2015/0310681 A1 | 10/2015 | Avery et al. |
| 2015/0356797 A1 | 12/2015 | McBride et al. |
| 2016/0112846 A1 | 4/2016 | Siswick et al. |
| 2016/0150407 A1 | 5/2016 | Michaud et al. |
| 2017/0062938 A1 | 3/2017 | Cheng et al. |
| 2017/0104589 A1 | 4/2017 | Lambert et al. |
| 2017/0132533 A1 | 5/2017 | Darnell et al. |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0269565 A1 | 9/2018 | Guthrie et al. |
| 2020/0296546 A1 | 9/2020 | Sawai |

FOREIGN PATENT DOCUMENTS

| | | |
|---|---|---|
| JP | 2002077972 A | 3/2002 |
| JP | 2016124477 A | 7/2016 |
| WO | WO-2014191572 A1 | 12/2014 |
| WO | WO-16156682 A1 | 10/2016 |
| WO | WO-2017181050 A1 | 10/2017 |
| WO | WO-18040641 A1 | 3/2018 |
| WO | WO-2019069590 A1 | 4/2019 |

* cited by examiner

VEHICLE CONTROLLED POLLING REDUCTION AT MOBILE DEVICE BASED ON MOTION STATUS REPORTED BY MOBILE DEVICE

FIELD

The present disclosure relates to passive entry/passive start systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional passive entry/passive start (PEPS) systems allow keyless entry including providing a user access to various vehicle functions if the user possesses a key fob that has been paired with an in-vehicle PEPS electronic control unit (or PEPS module). As an example, the user in possession of the key fob may approach a vehicle having the PEPS module. The key fob communicates with the PEPS module and if the key fob is authenticated, the PEPS module may unlock doors of the vehicle. The PEPS module (i) performs an authentication process to determine if the key fob is authorized to access the vehicle, and (ii) determines a location of the key fob relative to the vehicle. The authentication process may include the exchange of an encrypted password or signature. If the password or signature is correct, then the key fob is determined to be authorized. Location of the key fob may be determined based on, for example, strength of a signal received from the key fob. If the key fob is authenticated and is located within an authorized zone of the vehicle, then access to the interior of the vehicle is permitted without use of a traditional key.

As another example, the user in possession of the key fob may activate a vehicle function by pushing a button on the key fob. In response to pushing the button, the key fob communicates with the PEPS module and if the key fob is authenticated and within a predetermined distance of the vehicle, the PEPS module performs the stated function (e.g., starts the vehicle, opens a door, sets off an alarm, etc.) associated with the button pressed on the key fob. The communication performed for the two examples may include the key fob and the PEPS module performing a one-way low-frequency (LF) wake-up function and a one-way or two-way radio frequency (RF) authentication function.

A phone as a key (PAK) vehicle access system can operate similarly as the stated PEPs system, except the vehicle is accessed using a mobile phone rather than a key fob. As an example, the mobile phone can communicate with a PAK module or a telematics control unit (TCU) in the vehicle to begin an access pairing process. The mobile phone and either the PAK module or the TCU perform the access pairing process to establish a trust relationship. The pairing process can include Bluetooth® pairing whereby: security information is exchanged between the mobile phone and the vehicle directly; a mobile phone address, a mobile phone identity resolving key, a reservation identifier and/or an encryption key are exchanged via a cloud-based network; and/or the mobile phone presents a certificate to the vehicle, where the certificate is signed by (i) the mobile phone, (ii) a trusted security signing authority such as a manufacturer of the vehicle, and/or (iii) a trusted third party. In the case of a certificate, the certificate can include an identifier of a person authorized to access a vehicle, an identifier of a cloud-based network authorized to transfer the certificate, an identifier of a rental or lease agreement of the vehicle, an identifier of the vehicle, a date and time period during which the vehicle is permitted for use by the authorized person, and/or other restrictions and/or access/license information.

For passive entry, some user action is typically needed to initiate a process of waking up a key fob or mobile phone (referred to as portable access devices). For example, this may include a user approaching the vehicle with a portable access device and/or touching and/or pulling on a door handle. When a PEPS module or a PAK module, which are referred to as access modules, detects this behavior, the access module performs a localization process to begin searching for and waking up the key fob.

A controller of the key fob measures a LF signal level during communication with the access module. The controller determines a received signal strength indicator (RSSI) and provides the RSSI to the access module. The access module then determines a location of the key fob based on the RSSI.

A smartphone, a wearable device, and/or other smart portable network device may perform as a key fob. The smart portable network devices may enable various vehicle functions and long range distancing features, such as passive welcome lighting, distance bounding on remote parking applications, etc.

SUMMARY

A mobile device is provided and includes a sensor and a control module. The sensor is configured to detect movement of the mobile device. The control module is configured to: based on an output of the sensor, determine whether the mobile device is moving; when the mobile device is moving, transmit via a transceiver at least one signal to a vehicle indicating movement of the mobile device and an indication of presence of the mobile device; based on the at least one signal, receive an instruction signal or an information signal from the vehicle via the transceiver; based on the instruction signal or an information signal, at least one of reduce a polling rate of the mobile device, cease to indicate presence of the mobile device or transition to a sleep mode; and transition from the sleep mode to an awake mode in response to movement of the mobile device.

In other features, the indication is an advertisement of the presence of the mobile device. The control module is configured to, based on the instruction signal, reduce the polling rate at which the mobile device advertises presence of the mobile device to the vehicle.

In other features, the control module is configured to: subsequent to reducing the polling rate, determine the mobile device is moving; and in response to the mobile device moving, reset the polling rate to a maximum polling rate.

In other features, the control module is configured to, based on the instruction signal, cease indicating presence of the mobile device to the vehicle. In other features, the control module is configured to transition to the sleep mode based on the instruction signal.

In other features, the control module is configured to: subsequent to transitioning to the sleep mode, determine whether the mobile device is moving; and in response to the mobile device moving, transition back to the awake mode. In other features, the sensor is an accelerometer or a gyroscope.

In other features, the control module is configured to: transmit the at least one signal when the mobile device is external to the vehicle; and refrain from generating or transmitting the at least one signal when the mobile device is internal to the vehicle.

In other features, a system is provided and includes the mobile device and an access module. The access module is implemented in the vehicle. The access module receives the at least one signal and generates the instruction signal.

In other features, the information signal indicates at least one of a location of the mobile device or whether the mobile device is moving. The control module is configured to, based on the information signal, at least one of reduce the polling rate of the mobile device, cease to indicate presence of the mobile device or transition to the sleep mode.

In other features, the access module is configured to: determine a location of the mobile device relative to the vehicle and whether the mobile device is moving; and generate the instruction signal when the mobile device is within a predetermined distance of the vehicle and is not moving.

In other features, a system is provided and includes: a transceiver configured to receive at least one signal from a mobile device indicating movement of the mobile device and indicating the mobile device being in a vicinity of a vehicle; an access module configured to, based on the at least one signal, determine a location of the mobile device relative to the vehicle and whether the mobile device is moving; and a polling reduction module configured to, when the mobile device is within a predetermined range of the vehicle and is not moving, generate an instruction signal or an information signal to cause the mobile device to at least one of reduce a polling rate of the mobile device, cease indicating presence of the mobile device or transition to a sleep mode.

In other features the polling reduction module is configured to generate the instruction signal to instruct the mobile device to at least one of reduce the polling rate of the mobile device, cease indicating presence of the mobile device or transition to the sleep mode. In other features, the polling reduction module is configured to generate the information signal to inform the mobile device of at least one of a location of the mobile device or whether the mobile device is moving to cause the mobile device to at least one of reduce the polling rate of the mobile device, cease indicating presence of the mobile device or transition to the sleep mode.

In other features, the transceiver is configured to receive ultra-wideband signals. The access module is configured to, based on the ultra-wideband signals, determine the location of the mobile device and whether the mobile device is moving.

In other features, the access module is configured to determine a received signal strength indicator value, and based on the received signal strength indicator value, determine the location of the mobile device and whether the mobile device is moving.

In other features, the polling reduction module is configured to: determine whether the mobile device has been at a same location for greater than or equal to a predetermined period of time; when the mobile device has not been at the same location for greater than or equal to the predetermined period of time, generate the instruction signal to instruct the mobile device to reduce the polling rate or cease advertising presence of the mobile device; and when the mobile device has been at the same location for greater than or equal to the predetermined period of time, generate the instruction signal to instruct the mobile device to transition to the sleep mode.

In other features, the access module is configured to determine whether the mobile device is moving away from the vehicle and outside the predetermined range, and when the mobile device is outside the predetermined range and moving away from the vehicle generate the instruction signal.

In other features, a method is provided and includes: determining whether a mobile device is moving; when the mobile device is moving, transmitting from the mobile device at least one signal to a vehicle indicating movement by the mobile device and an indication of presence of the mobile device; receiving the at least one signal from the mobile device at an access module of the vehicle; based on the at least one signal, determining a location of the mobile device relative to the vehicle and whether the mobile device is moving; and when the mobile device is within a predetermined range of the vehicle and is not moving, generating an instruction signal to instruct the mobile device to at least one of reduce a polling rate of the mobile device, cease indicating presence of the mobile device or transition to a sleep mode.

In other features, the method further includes: receiving the instruction signal from the access module at the mobile device; and based on the instruction signal, at least one of reducing the polling rate of the mobile device, ceasing advertising presence of the mobile device or transitioning to the sleep mode.

In other features, the method further includes: receiving ultra-wideband signals; and based on the ultra-wideband signals, determining the location of the mobile device and whether the mobile device is moving.

In other features, the method further includes: determining a received signal strength indicator value; and based on the received signal strength indicator value, determining the location of the mobile device and whether the mobile device is moving.

In other features, the method further includes: determining whether the mobile device has been at a same location for greater than or equal to a predetermined period of time; when the mobile device has not been at the same location for greater than or equal to the predetermined period of time, generating the instruction signal to instruct the mobile device to reduce the polling rate or cease advertising; and when the mobile device has been at the same location for greater than or equal to the predetermined period of time, generating the instruction signal to instruct the mobile device to transition to the sleep mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A PAK system may include multiple ultra-wideband (UWB) sensors installed throughout a vehicle and one or more Bluetooth® low-energy (BLE) nodes (e.g., BLE transceivers and antennas). The BLE nodes are also implemented in the vehicle and used to wakeup a mobile access device (e.g., a keyfob, a mobile phone, a wearable device, etc.). The UWB sensors are used to determine the location of the mobile device relative to the vehicle. As further described herein, when determining a location of a mobile device, it is determined whether the mobile device is in or outside of one or more predefined zones relative to the corresponding vehicle. The predefined zones may include one or more zones internal or external to the vehicle. The internal zones may include one or more zones within a cabin of the vehicle and/or in other areas of the vehicle, such as in a trunk or tail gate space of the vehicle.

The examples set forth herein include access systems, such as PAK systems, that include mobile devices reporting motion statuses to a vehicle access module and the vehicle access module reducing polling rates and/or ceasing advertising of the mobile devices. The reduction in polling rates and/or the ceasing of advertising of the mobile devices is based on the motion statuses of the mobile devices. The vehicle access module may also instruct the mobile devices to transition to a sleep mode. These features reduce power consumption in the mobile devices and the vehicle.

Figure 1:
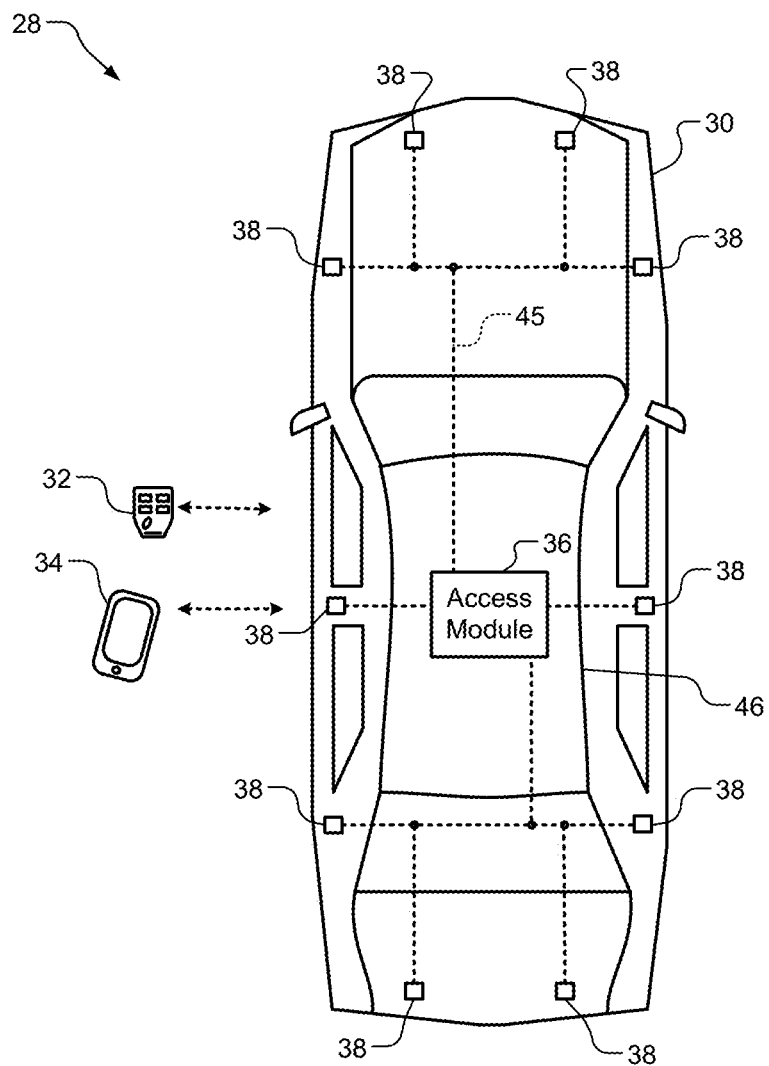
FIG. 1 is a functional block diagram of an example of a vehicle access system including an access module, antennas, and portable access devices in accordance with an embodiment of the present disclosure.

FIG. 1 shows a vehicle access system 28 that performs as a PEPS system and a PAK system. The vehicle access system 28 includes a vehicle 30 and may include a key fob 32, a mobile phone 34, and/or other portable access devices, such as a wearable device, a laptop computer, or other portable network device. The portable access devices may be, for example, a Bluetooth®-enabled communication device, such as a smart phone, smart watch, wearable electronic device, key fob, tablet device, or other device associated with a user of the vehicle 30. The user may be an owner, driver, or passenger of the vehicle 30 and/or a technician for the vehicle 30.

The vehicle 30 includes an access module 36 and antenna modules 38. One or more of the antenna modules 38 may be included in the access module 36. As an example, the antenna modules 38 may each be implemented as one or more antennas. The access module 36 may wirelessly transmit and receive LF, BLE and/or UWB signals via the antenna modules 38 including wirelessly communicating with the portable access devices. As an example, the UWB signals may be spread over a large bandwidth of greater than 500 Mega-Hertz (MHz). The LF, BLE and/or UWB signals may be transmitted to and/or received from the portable access devices and used to track a location and movement of the portable access devices. Although particular numbers of antenna modules 38 are shown, any number of each may be utilized. The access module 36 may communicate with some of the antenna modules 38 wirelessly and/or via a vehicle interface 45. As an example, the vehicle interface 45 may include a controller area network (CAN) bus, a local interconnect network (LIN) for lower data-rate communication, a clock extension peripheral interface (CXPI) bus and/or one or more other vehicle interfaces.

The antenna modules 38 may be at various locations on the vehicle and transmit and receive low frequency signals (e.g., 125 kHz signals), high frequency RF (e.g., BLE) signals and/or UWB signals. Each of the antenna modules 38 includes an LF, RF (or BLE) and/or UWB antenna and may include a control module and/or other circuitry for LF, RF (or BLE) and/or UWB signal transmission. The antenna modules 38 may transmit BLE signals according to BLE communication protocols. Alternatively, the antenna modules 38 may communicate according to other wireless communication protocols, such as wireless fidelity (Wi-Fi). In one embodiment and to improve signal coverage relative to the vehicle and improve transmission and reception characteristics, the antenna modules 38 are located in a roof 46 of the vehicle 30.

Figure 2:
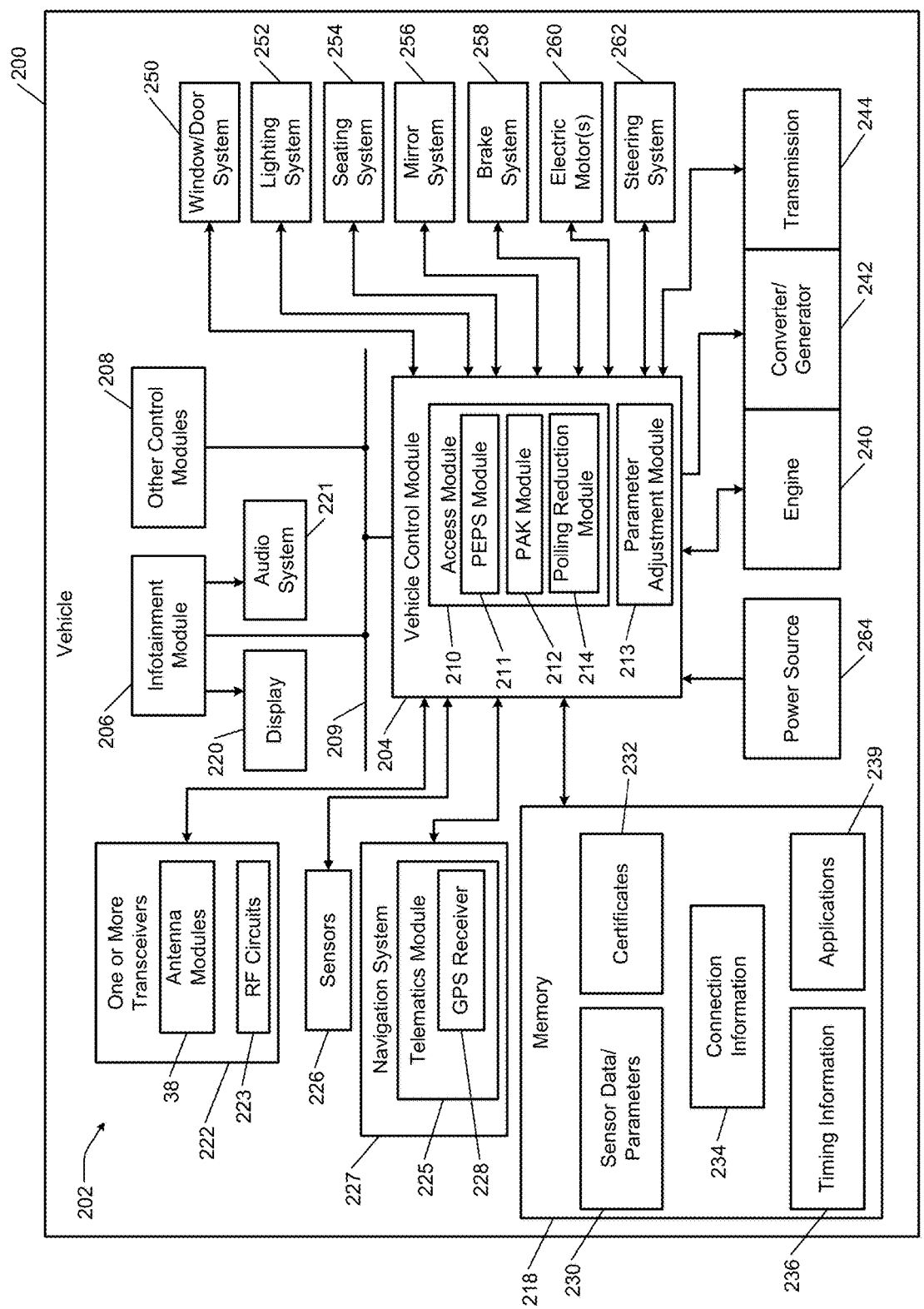
FIG. 2 is a functional block diagram of an example of a vehicle including another access module in accordance with an embodiment of the present disclosure.
Figure 3:
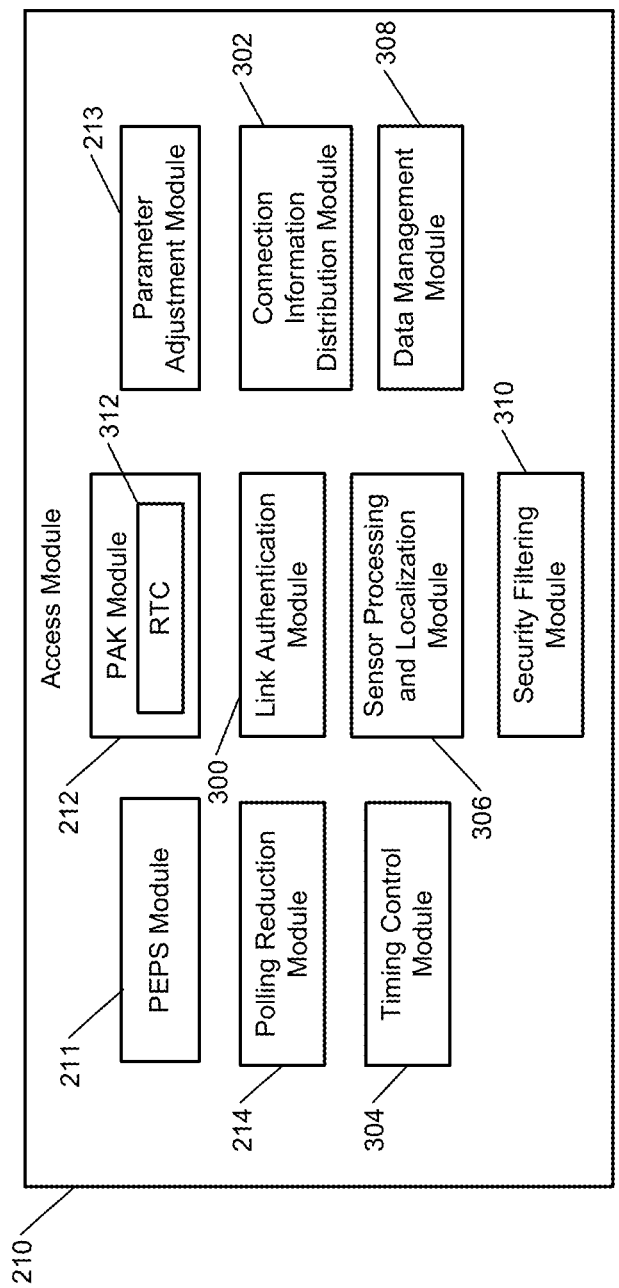
FIG. 3 is a functional block diagram of an example of the access module of FIG. 2 in accordance with an embodiment of the present disclosure.

FIG. 2 shows a vehicle 200 that is an example of the vehicle 30 of FIG. 1. The vehicle 200 includes a PAK system 202, which includes a vehicle control module 204, an infotainment module 206 and other control modules 208 (e.g., a body control module). The modules 204, 206, 208 may communicate with each other via a bus 209 and/or other vehicle interface (e.g., the vehicle interface 45 of FIG. 1). As an example, the bus 209 may include a controller area network (CAN) bus, a local interconnect network (LIN) for lower data-rate communication, a clock extension peripheral interface (CXPI) bus and/or one or more other vehicle interfaces. The vehicle control module 204 may control operation of vehicles systems. The vehicle control module 204 may include an access module 210, a PEPS module 211, a PAK module 212 a parameter adjustment module 213 and a polling reduction module 214, as well as other modules, which are shown in FIG. 3. FIG. 2 is an example of when an access module (e.g., the access module 210) is implemented as a separate module from the antenna modules 38 and transceivers 222.

The vehicle control module 204 may also include one or more processors that are configured to execute instructions stored in a non-transitory computer-readable medium, such as the memory 218, which may include read-only memory (ROM) and/or random access memory (RAM).

The PEPS module 211 may perform PEPS operations to provide access to an interior of the vehicle and permit starting and/or operation of the vehicle. The PAK module 212 operates in cooperation with the PEPS module 211 and performs PAK operations as described herein. The PEPS module 211 may include the PAK module 212 or the modules 211, 212 may be implemented as a single module. The parameter adjustment module 213 may be used to adjust parameters of the vehicle 200. The polling reduction module 214 determines whether to signal a portable access device to reduce a polling rate, cease advertising presence of the portable access device to the vehicle 200, and/or transition to a sleep mode. These features are further described below.

The PAK system 202 may further include: a memory 218; a display 220; an audio system 221; and one or more transceivers 222 including the antenna modules 38. The antenna modules 38 may include and/or be connected to RF circuits 223. The PAK system 202 may further include: a telematics module 225; sensors 226; and a navigation system 227 including a global positioning system (GPS) receiver 228. The RF circuits 223 may be used to communicate with a mobile device (e.g., the mobile device 102 of FIG. 1) including transmission of Bluetooth® signals at 2.4 giga-Hertz (GHz). The RF circuits 223 may include BLE radios, transmitters, receivers, etc. for transmitting and receiving RF signals.

The one or more transceivers 222 may include a RF transceiver including the RF circuits 223 and implement an access application having code to inspect timestamped data received and transmitted by the antenna modules 38. The access application may confirm whether the antenna modules 38 have, for example, received correct data at the correct time. The access application may be stored in the memory 218 and implemented by the PEPS module 211 and/or the PAK module 212. Other example operations of the access application are further described below.

The access application may implement a Bluetooth® protocol stack that is configured to provide a channel map, access identifier, next channel, and a time for a next channel. The access application is configured to output timing signals for timestamps for signals transmitted and received via the antenna modules 38. The access application may obtain channel map information and timing information and share this information with other modules in the vehicle.

The telematics module 225 may communicate with a server via a cell tower station. This may include the transfer of certificates, license information, and/or timing information including global clock timing information. The telematics module 225 is configured to generate location information and/or error of location information associated with the vehicle 200. The telematics module 225 may be implemented by a navigation system 227.

The sensors 226 may include sensors used for PEPS and PAK operations, cameras, objection detection sensors, temperature sensors, accelerometers, vehicle velocity sensor, and/or other sensors. The sensors 226 may include a touch sensor to detect, for example, a person touching a door handle to initiate a process of waking up a portable access device. The sensors 226 may be connected to the other control modules 208, such as the body control module, which may be in communication with LF and RF antenna circuits and/or modules disclosed herein. The GPS receiver 228 may provide vehicle velocity and/or direction (or heading) of the vehicle and/or global clock timing information.

The memory 218 may store sensor data and/or parameters 230, certificates 232, connection information 234, timing information 236, and applications 239. The applications 239 may include applications executed by the modules 38, 204, 206, 208, 210, 211, 212, 214, 223 and/or transceivers 222. As an example, the applications may include the access application, a PEPS application and/or a PAK application executed by the transceivers 222 and the modules 210, 211, 212 and/or 214. Although the memory 218 and the vehicle control module 204 are shown as separate devices, the memory 218 and the vehicle control module 204 may be implemented as a single device. The single device may include one or more other devices shown in FIG. 1.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208, 210, 211, 212, 213, 214. The vehicle control module 204 may perform PEPS and/or PAK operations, which may include setting some of the parameters. The PEPS and PAK operations may be based on signals received from the sensors 226 and/or transceivers 222. The vehicle control module 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the PEPS and PAK operations may include unlocking doors of the window/door system 250, enabling fuel and spark of the engine 240, starting the electric motors 260, powering any of the systems 250, 252, 254, 256, 258, 262, and/or performing other operations as are further described herein.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 204 to, for example, adjust fuel, spark, air flow, steering wheel angle, throttle position, pedal position, door locks, window position, seat angles, etc. This control may be based on the outputs of the sensors 226, the navigation system 227, the GPS 228 and the above-stated data and information stored in the memory 218.

FIG. 3 shows the access module 210. The access module 210 includes the PEPS module 211, the PAK module 212, the parameter adjustment module 213, the polling reduction module 214 and may further include a link authentication module 300, a connection information distribution module 302, a timing control module 304, a sensor processing and localization module 306, a data management module 308 and a security filtering module 310. The PAK module 212 may include a real time clock (RTC) 312 that maintains a local clock time.

The link authentication module 300 may authenticate the portable access devices of FIG. 1 and establish the secure communication link. For example, the link authentication module 300 can be configured to implement challenge-response authentication or other cryptographic verification algorithms in order to authenticate the portable access devices.

The connection information distribution module 302 is configured to communicate with some of the sensors 226 of FIG. 2 and provide the sensors with communication information necessary for the sensors to find and then follow, or eavesdrop on, the secure communication link. This may occur once the sensors are synchronized with a communication gateway, which may be included in or implemented by one of the transceivers 222. As an example, the vehicle 200 and/or the PAK system 202 may include any number of sensors disposed anywhere on the vehicle 200 for detecting and monitoring mobile devices. The connection information distribution module 302 is configured to obtain information corresponding to communication channels and channel switching parameters of a communication link and transmit the information to the sensors 226. In response to the sensors 226 receiving the information from the connection information distribution module 302 via a bus or other vehicle interface disclosed herein and the sensors 226 being synchronized with the communication gateway, the sensors 226 may locate and follow, or eavesdrop on, the communication link.

The timing control module 304 may: maintain the RTC and/or currently stored date if not handled by the PAK module 212; disseminate current timing information with the sensors; generate timestamps for incoming and outgoing messages, requests, signals, certificates, and/or other items; calculate round trip times; etc. A round trip time may refer to the amount between when a request is generated and/or transmitted and a time when a response to the request is received. The timing control module 304 may obtain timing information corresponding to a communication link when the link authentication module 300 executes challenge-response authentication. The timing control module 302 is also configured to provide the timing information to the sensors 226 via the vehicle interface 209.

After link authentication is established, the data management module 308 collects the current location of the vehicle 108 from the telematics module 225 and shares the location with the portable access devices. The portable access devices optionally include GPS modules and application software that when executed compares the estimated relative locations of the portable access devices to the vehicle 108. Based on the estimated positions of the portable access devices relative to the vehicle 108, the portable access devices can send signals to one of the transceivers 222 requesting the vehicle to perform certain actions. As an example, the data management module 308 is configured obtain vehicle information obtained by any of the modules (e.g., location information obtained by a telematics module 225) and transmit the vehicle information to the portable access devices.

The security filtering module 310 detects violations of a physical layer and protocol and filter data accordingly before providing information to the sensor processing and localization module 306. The security filtering module 310 flags data as injected such that the sensor processing and localization module 306 is able to discard data and alert the PEPS module 211. The data from the sensor processing and localization module 306 is passed along to the PEPS module 211, whereby the PEPS module 211 is configured to read vehicle state information from the sensors in order to detect user intent to access a feature and to compare the location of the mobile device 102 to a set of locations that authorize certain vehicle features, such as unlocking a door or trunk of the vehicle and/or starting the vehicle.

Figure 4:
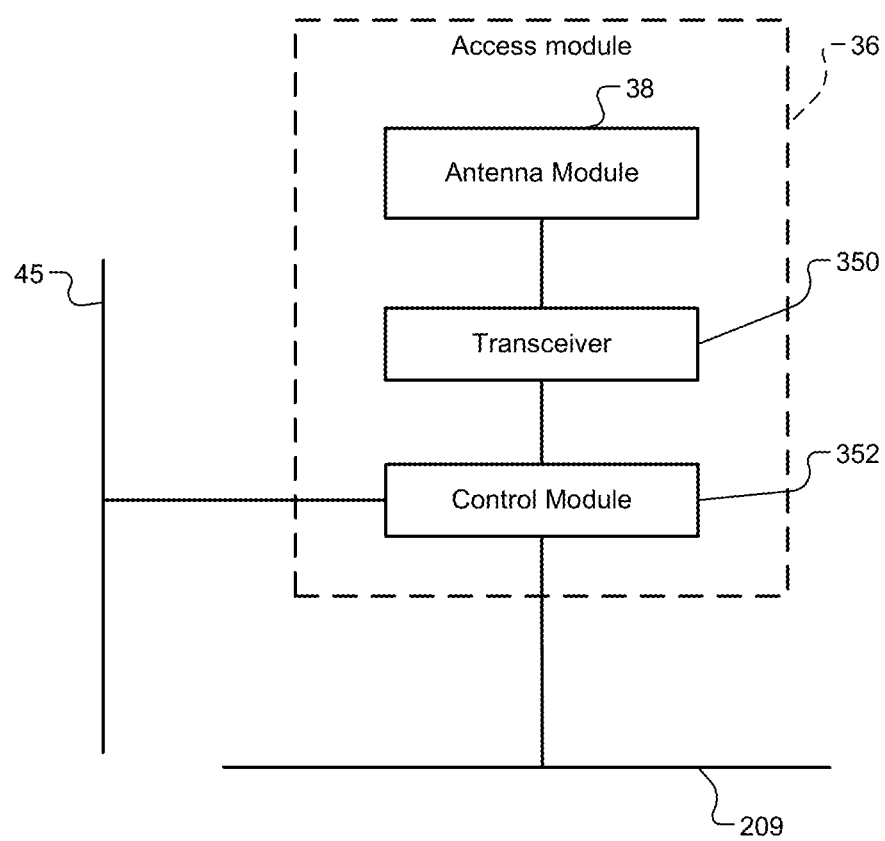
FIG. 4 is a functional block diagram of an example of the access module of FIG. 1.

FIG. 4 is an example of the access module 36 of FIG. 1. The access module 36 may include an antenna module 38, a transceiver 350 and a control module 352. The control module 352 may be implemented similarly as the access module 210 of FIGS. 2 and 3. The transceiver 350 may be configured to transmit and/or receive LF, RF, BLE and/or UWB signals. The control module 352 may include or be part of a BLE communication chipset and/or include or be part of a Wi-Fi or Wi-Fi direct communication chipset. Some or all of the operations of the control module 352 may be implemented by one or more of the modules 204, 210, 211, 212, 214 of FIG. 2.

The control module 352 (or one or more of the modules 204, 210, 211, 212 of FIG. 2) may establish a secure communication connection with a portable access device (e.g., one of the portable access devices 32, 34 of FIG. 1). For example, the control module 352 may establish a secure communication connection using the BLE communication protocol this may include transmitting and/or receiving timing and synchronization information. The timing and synchronization information may include information directed to the secure communication connection, such as timing of next communication connection events, timing intervals between communication connection events, communication channels for next communication connection events, a channel map, a channel hop interval or offset, communication latency information, communication jitter information, etc. The control module 352 may detect (or "eavesdrop") packets sent by the portable access device to the vehicle control module 204 and measure signal information of the signals received from the portable access device. The channel hop interval or offset may be used to calculate a channel for a subsequent communication connection event.

The control module 352 may measure a received signal strength of a signal received from the portable access device and generate a corresponding RSSI value. Additionally or alternatively, the control module 352 may take other measurements of transmitted and received signals from the portable access device, such as an angle of arrival, a time of flight, a time of arrival, a time difference of arrival, etc. As an example, time of flight calculations may be made to measure time of flight of UWB signals. The control module 352 may then send the measured information to the vehicle control module 204, which may then determine a location of and/or distance to the portable access device relative to the vehicle 30 based on the measured information. The location and distance determinations may be based on similar information received from one or more other antenna modules and/or other sensors.

As an example, the vehicle control module 204 may determine the location of the portable access device based on, for example, the patterns of the RSSI values corresponding to signals received from the portable access device by the antenna modules 38. A strong (or high) RSSI value indicates that the portable access device is close to the vehicle 30 and a weak (or low) RSSI value indicates that the portable access device is further away from the vehicle 30. By analyzing the RSSI values, the control module 204 may determine a location of and/or a distance to the portable access device relative to the vehicle 30. Additionally or alternatively, angle of arrival, angle of departure, round trip timing, unmodulated carrier tone exchange, or time difference of arrival measurements for the signals sent between the portable access device and the control module 204 may also be used by the control module 204 or the portable access device to determine the location of the portable access device. Additionally or alternatively, the antenna modules 38 may determine the location of and/or distance to the portable access device based on the measured information and communicate the location or distance to the control module 204.

Based on the determined location of or distance to the portable access device relative to the vehicle 30, the modules 211, 212 of FIG. 2 may then authorize and/or perform a vehicle function, such as unlocking a door of the vehicle 30, unlocking a trunk of the vehicle 30, starting the vehicle 30, and/or allowing the vehicle 30 to be started. As another example, if the portable access device is less than a first predetermined distance from the vehicle 30, the modules 211, 212 may activate interior or exterior lights of the vehicle 30. If the portable access device is less than a second predetermined distance from the vehicle 30, the modules 211, 212 may unlock doors or a trunk of the vehicle 30. If the portable access device is located inside of the vehicle 30, the modules 211, 212 may allow the vehicle 30 to be started.

Based on the determined location of or distance to the portable access device relative to the vehicle 30, the polling reduction module 214 may also perform certain operations as further described below.

Figure 5:
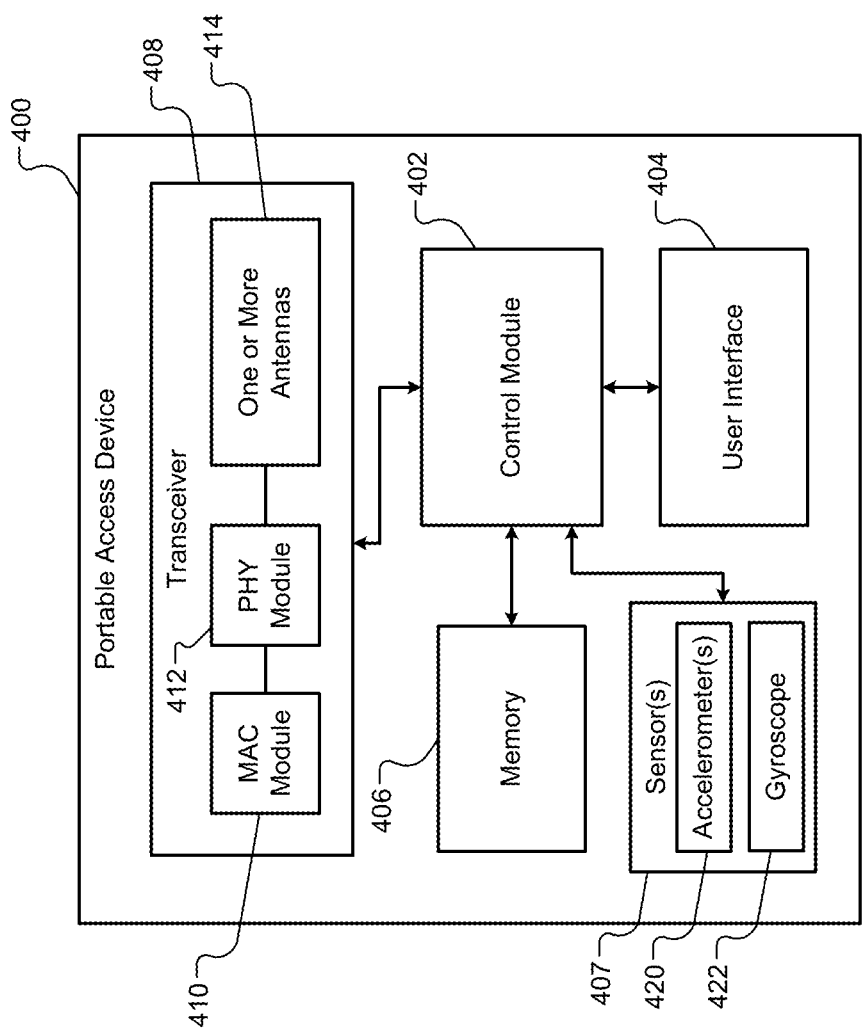
FIG. 5 is a functional block diagram of an example of a portable network device in accordance with an embodiment of the present disclosure.

FIG. 5 shows an example portable access device 400, which is an example of one of the portable access devices 32, 34 of FIG. 1. The portable access device 400 may include a control module 402, a user interface 404, a memory 406, sensors 407 and a transceiver 408. The transceiver 408 may include a MAC module 410, a PHY module 412 and one or more antennas 414.

The control module 402 may include or be part of a BLE communication chipset. Alternatively, the control module 402 may include or be part of a Wi-Fi or Wi-Fi direct communication chipset. The memory 406 may store application code that is executable by the control module 402. The memory 406 may be a non-transitory computer-readable medium including read-only memory (ROM) and/or random-access memory (RAM).

The control module 402 communicates with the modules 204 and 350 of the vehicle and performs authentication and other operations as further described below. The control module 402 may transmit information regarding the portable access device 400, such as location, heading and/or velocity information obtained from one or more of the sensors 407 (e.g., a global navigation satellite system (e.g., GPS) sensor, an accelerometer, a gyroscope, and/or an angular rate sensor). In the example shown, the sensors 407 include one or more accelerometers 420 and/or a gyroscope 422. In another embodiment, the gyroscope 422 is not utilized. The user interface 404 may include a key pad, a touch screen, a voice activated interface, and/or other user interface.

Figure 6:
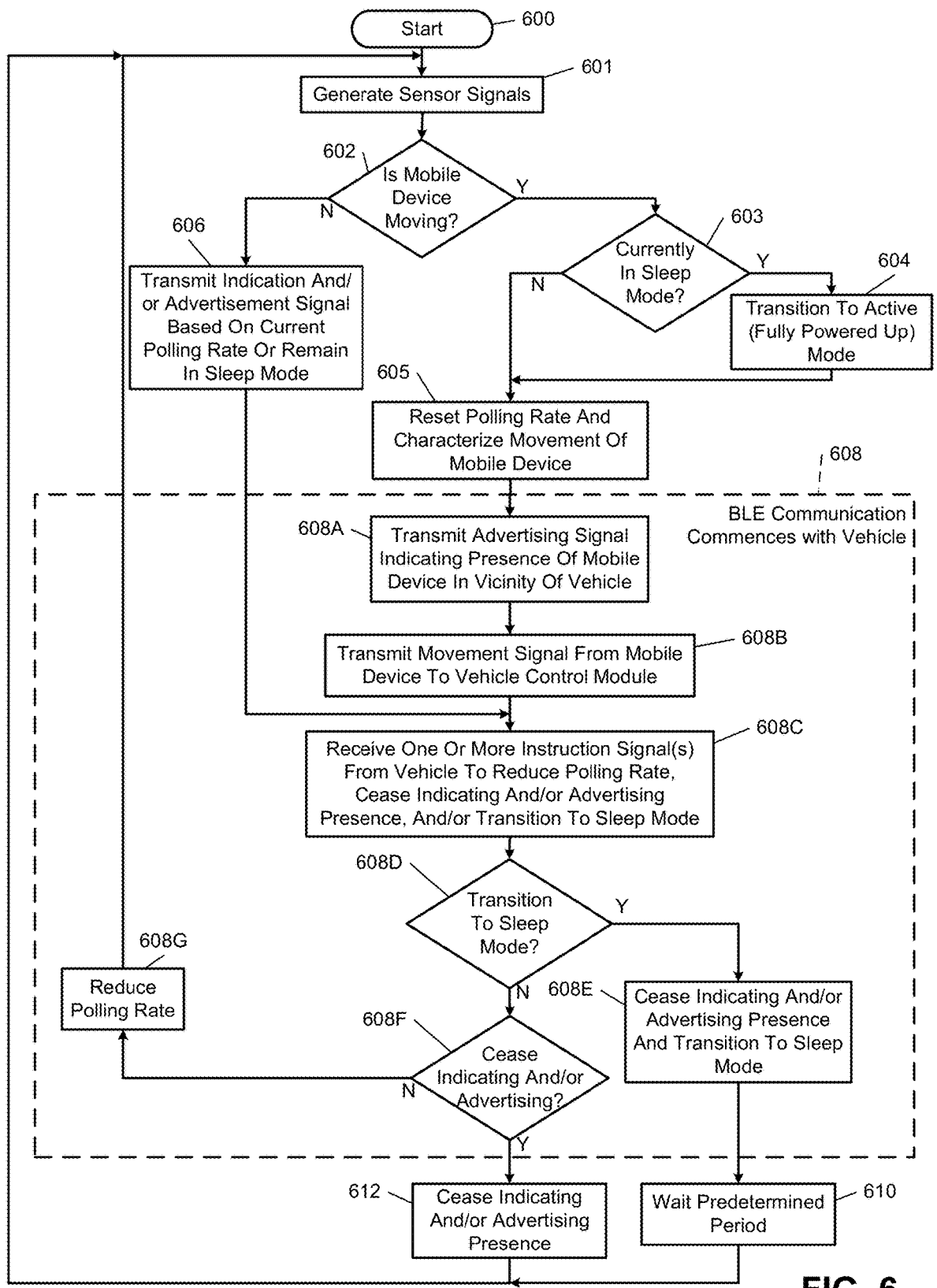
FIG. 6 illustrates a first portion of a polling reduction method implemented via a control module of a mobile access device in accordance with an embodiment of the present disclosure.
Figure 7:
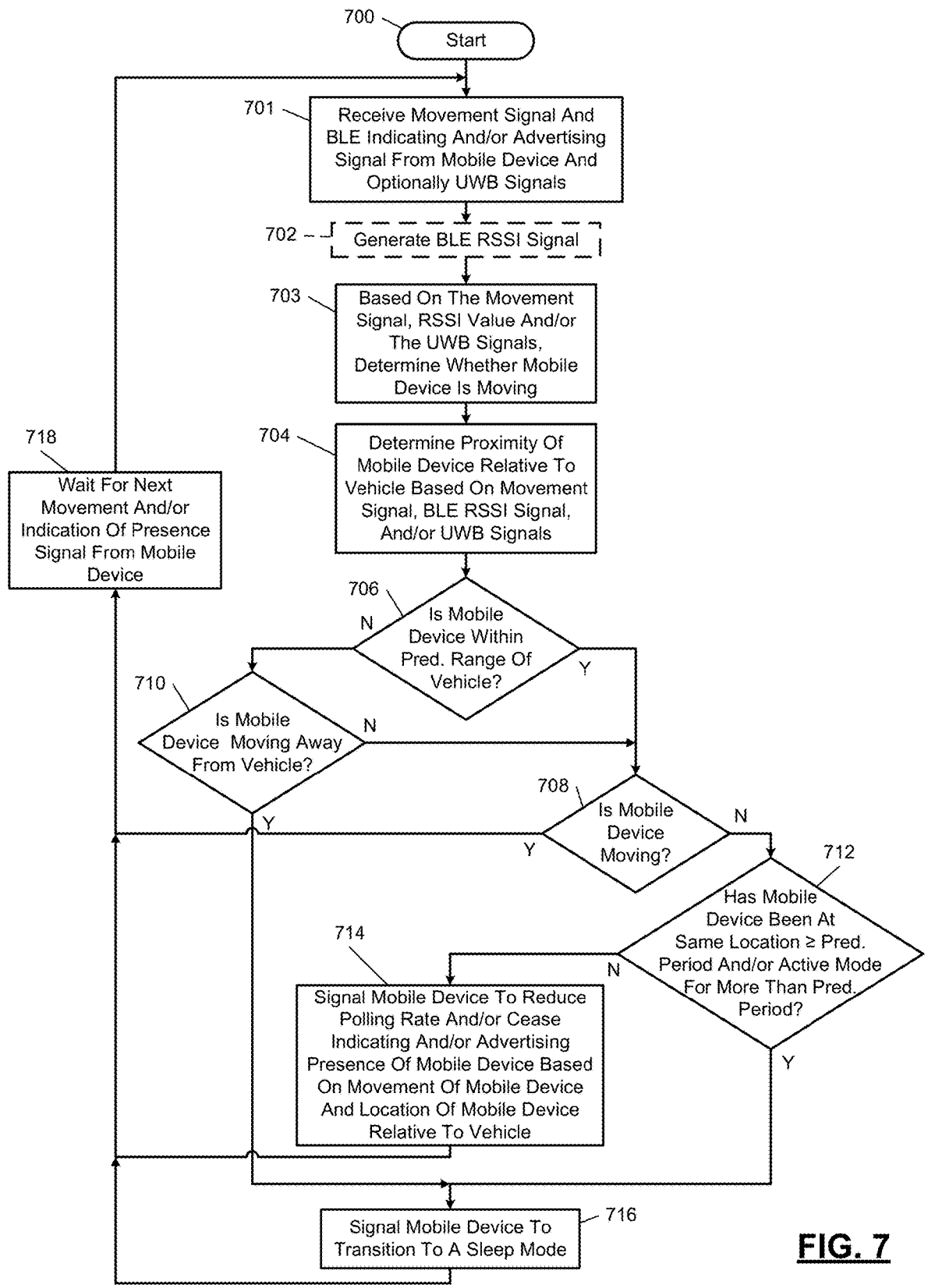
FIG. 7 illustrates a second portion of the polling reduction method implemented via an access module of a vehicle in accordance with an embodiment of the present disclosure.

FIGS. 6-7 illustrate a polling reduction method. The polling reduction method may be performed when a mobile device is outside of a vehicle. A first portion of the polling reduction method is implemented primarily via the control module 402 of the portable access device 400 (or mobile device) of FIG. 5. The second portion of the polling reduction method is implemented primarily via the access module 210 and/or polling reduction module 214 of the vehicle 200 of FIG. 2. Although the following operations are primarily described with respect to the implementations of FIGS. 1-5, the operations may be easily modified to apply to other implementations of the present disclosure. The operations may be iteratively performed.

The first portion of the method may begin at 600. At 601, the sensors 407 generate sensor signals. At 602, the control module 402 determines, based on the sensor signals, whether the mobile device is moving. If the mobile device is moving, operation 603 is performed, otherwise operation 606 may be performed.

At 603, the control module 402 determines whether the mobile device is in a sleep mode. If in a sleep mode, the control module 402 performs operation 604 and transitions to an active (full power up) mode if not already in the active mode. The sleep mode refers to a reduced power mode in which the mobile device is able to perform limited functions to determine whether to transition to the active (or full power up) mode. While in the sleep mode, the control module 402 does not transmit advertisement signals and/or provide any other indication of presence of the mobile device. An advertisement refers to a certain communication protocol of transmitting a signal and listening for a response. An advertisement is one example of indicating presence. Other forms of indicating presence may also be implemented as described herein. Operation 605 is performed subsequent to operations 603 and 604.

At 605, the control module 402 resets the polling rate to a maximum polling rate and characterizes the movement of the mobile device. This may include determining a heading (or direction) and speed that the mobile device is moving. The control module 402 generates a movement signal indicating the heading and the speed of the mobile device and whether the mobile device is moving. Operation 608A is performed subsequent to performing operation 605.

At 606, the control module 402 may transmit a next indication of presence and/or advertisement signal based on the current polling rate or remain in sleep mode. An indication of presence signal may be an advertisement signal or may be associated with scanning and/or other presence alerting communication protocol. If not in the sleep mode, the next indication of presence and/or advertisement signal may be transmitted at a current polling rate. If the polling rate is zero, then an indication of presence signal (or advertisement signal) is not transmitted. If the polling rate is not zero, then the indication of presence and/or advertisement signal is transmitted according to the polling rate, which may be a reduced polling rate if operation 608 was previously performed. If in sleep mode, an advertisement signal is not transmitted. Operation 608C is performed subsequent to performing operation 606.

At 608, BLE communication commences with the vehicle. At 608A, the control module 402 transmits an indication and/or advertisement signal indicating presence of the mobile device in the vicinity of the vehicle. At 608B, the control module 402 transmits the movement signal from the mobile device to the vehicle for eventual reception at the access module 210. In one embodiment, the indication and/or advertisement signal of 608A includes a movement indication field with movement information, such as the heading and speed of the mobile device, and operation 608B is not performed, such that the movement signal is not generated.

At 608C, the control module 402 receives an instruction signal from the access module 210 of the vehicle, as generated at below described operation 706. The instruction signal may be received subsequent to and/or in response to the movement of the mobile device and/or the indication and/or advertisement signal generated at 606 or 608A. The instruction signal informs the vehicle to (i) reduce a polling rate, (ii) cease indicating and/or advertising presence of the mobile device, and/or (iii) transition to the sleep mode. The reduction in the polling rate refers to the mobile device reducing a rate at which the mobile device sends an indication and/or advertisement signal indicating presence of the mobile device in a vicinity of the vehicle.

At 608D, the control module 402 if transitioning to the sleep mode proceeds to operation 608E, otherwise performs 608F. At 608E, the control module 402 ceases indicating and/or advertising presence of the mobile device and transitions to the sleep mode (or low power state). Operation 610 may be performed subsequent to operation 608E in which case the control module 402 waits a predetermined period of time before proceeding to operation 601.

At 608F, the control module 402 proceeds to operation 612 if ceasing indication and/or advertising and proceeds to operation 608G when not ceasing indicating and/or advertising. At 608G, the control module 402 reduces the polling rate. The polling rate may be reduced by a predetermined amount. This may occur multiple times if operation 608G is performed multiple times prior to the polling rate being reset at 605.

At 612, the control module ceases indicating and/or advertising presence of the mobile device to the vehicle. Operation 601 may be performed subsequent to performing operation 612.

FIG. 7 shows the second portion of the polling reduction method. The second portion may begin at 700. At 701, the access module 210 receives a movement signal and a BLE indication and/or advertisement signal from the control module 402 as generated at 606, 608A, and 608B above. The access module 210 may also receive UWB signals.

At 702, the access module 210 may generate a BLE RSSI signal and/or determines a RSSI value based on a received BLE signal (e.g., the BLE indication and/or advertisement signal) from the mobile device. The BLE RSSI signal indicates the RSSI value. At 703, the access module 210, based on information in the movement signal, the RSSI value and/or the UWB signals determines whether the mobile device is moving.

At 704, the access module 210 determines proximity of the mobile device relative to the vehicle based on the movement signal, the RSSI value and/or the UWB signals. At 706, the access module 210 determines whether the mobile device is within a predetermined range of the vehicle. If the mobile device is within the predetermined range, operation 708 is performed, otherwise operation 710 may be performed. Reducing the polling rate reduces the amount of power consumed. The mobile device is considered to be in a lower power state (or lower power mode) than the fully powered up mode.

At 708, the access module 210 determines whether the mobile device is moving based on the movement signal, the RSSI value and/or the UWB signals. If the mobile device is moving, operation 718 may be performed, otherwise operation 712 may be performed.

At 710, the access module 210 determines whether the mobile device is moving away from the vehicle. If the mobile device is moving away from the vehicle, operation 716 is performed, otherwise operation 708 is performed.

At 712, the polling reduction module 214 determines whether the mobile device has been at a same location relative to the vehicle for greater than or equal to a first predetermined period of time and/or whether the mobile device has been in the active mode for more than a second predetermined period of time. As an example, the polling reduction module 214 may determine an amount of time that the mobile device has been in the active mode based on signals received from the mobile device, such as the movement signal and/or other signal transmitted by the mobile device. The mobile device is in the active mode when transmitting the movement signal. Thus, a timer may be activated when a first movement signal is received and monitored to determine a minimum awake time (or amount of time the mobile device has been in the active mode). The second predetermined period of time may be the same or different than the first predetermined period of time. If this is TRUE, then operation 716 is performed, otherwise operation 714 is performed. As an example, when the mobile device is in a same location and/or within the vehicle for more than the first predetermined period of time, then operation 716 may be performed. This is unlike when a user enters the vehicle with the mobile device and the mobile device is in the vehicle and stationary for a short period of time. In this situation, the user may within a short period of time press a start button to start the vehicle, in which case, the mobile device is not placed in a sleep mode.

At 714, the polling reduction module 214 generates an instruction signal to instruct the mobile device to reduce the polling rate and/or cease indicating and/or advertising presence of the mobile device. This is based on the movement of the mobile device relative to the vehicle, the location of the mobile device relative to the vehicle and/or movement history of the mobile device relative to the vehicle.

At 716, the access module 210 transmits an instruction signal to the mobile device to transition to the sleep mode. Operation 718 is performed subsequent to operations 714 and 716. At 718, the access module 210 may wait for a next movement and/or indication and/or advertisement signal from the mobile device and proceed to operation 701 as shown or to operation 702 or 703.

The above-described operations of FIGS. 6 and 7 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above provided examples may be applied in a PEPS UWB/BLE system and used to reduce power consumption in mobile (or portable access) devices and in a vehicle. Movement of the mobile device, which is characterized by the mobile device, is shared with a vehicle for purposes of reducing frequency of polling to a point where battery life and charge are substantially improved. This movement information is used in combination with RSSI to ascertain movement and location of the mobile device relative to the vehicle. This is better than using simply the RSSI because people and objects move in a vicinity of the vehicle or mobile device, which causes the RSSI to be substantially affected. By taking, for example, accelerometer data (or other movement data) into account, a more reliable assessment of the state of the location and movement of the mobile device is determined. This assessment is used to request the mobile device reduce an advertising rate or cease advertising, which reduces power consumption. Once the mobile device moves, advertisement polling rates are increased or resumed.

In certain situations, the mobile device may cease advertising without being instructed. For example, when a mobile device determines that it has not been used for a predetermined period of time and/or is outside of a predetermined range of a vehicle, the control module 402 may transition to a sleep mode and/or stop advertising to conserve power. In certain situations, the mobile device does not shutoff advertising without being instructed to shutoff advertising. For example, when the mobile device is within a predetermined distance of a vehicle and is not moving, the mobile device does not shutoff advertising unless instructed by the access module 210. If the mobile device were to shutoff advertising in this situation, a communication link between the mobile device and the access module and/or other module of the vehicle may never be established.

In another embodiment, the access (or polling reduction) module of the vehicle provides information to the control module 402 of the mobile device and the control module 402 based on the provided information determines whether to transition to a sleep mode, reduce an advertising and/or polling rate, and/or cease advertising and/or polling. As an example, the access module of the vehicle may signal the control module: location information indicating a location of the mobile device relative to the vehicle; a location of the vehicle; information indicating whether the mobile device is moving relative to the vehicle including speed and/or heading information; whether certain parameters satisfy a predetermined criterion for reducing an advertising and/or polling rate; etc. The control module 402 may then determine based on the received information and/or other information collected and/or determined by the mobile device whether to transition to a sleep mode, reduce an advertising and/or polling rate, and/or cease advertising and/or polling. These operations may replace some or all of operations 608C-608F, 612, 714 and 716 described above with respect to FIGS. 6-7. The control module 402 may also determine whether it has not been used for a predetermined period of time and/or is outside of a predetermined range of the vehicle and transition to a sleep mode and/or stop advertising to conserve power, as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript® Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A mobile device comprising:
    a sensor configured to detect movement of the mobile device; and
    a control module configured to
        based on an output of the sensor, determine whether the mobile device is moving,
        when the mobile device is moving, transmit via a transceiver at least one signal to a vehicle indicating movement of the mobile device and an indication of presence of the mobile device,
        based on the at least one signal, receive an instruction signal or an information signal from the vehicle via the transceiver,
        based on the instruction signal or the information signal, at least one of reduce a polling rate of the mobile device, cease to indicate presence of the mobile device or transition to a sleep mode, and
        transition from the sleep mode to an awake mode in response to movement of the mobile device.

2. The mobile device of claim 1, wherein:
    the indication is an advertisement of the presence of the mobile device; and
    the control module is configured to, based on the instruction signal, reduce the polling rate at which the mobile device advertises presence of the mobile device to the vehicle.

3. The mobile device of claim 2, wherein the control module is configured to:
    subsequent to reducing the polling rate, determine the mobile device is moving; and
    in response to the mobile device moving, reset the polling rate to a maximum polling rate.

4. The mobile device of claim 1, wherein the control module is configured to, based on the instruction signal, at least one of cease indicating presence of the mobile device to the vehicle or transition to the sleep mode.

5. The mobile device of claim 1, wherein the control module is configured to:
    subsequent to transitioning to the sleep mode, determine whether the mobile device is moving; and
    in response to the mobile device moving, transition back to the awake mode.

6. The mobile device of claim 1, wherein the control module is configured to:
    transmit the at least one signal when the mobile device is external to the vehicle; and
    when the mobile device is internal to the vehicle for a predetermined period of time, (i) cease indicating presence of the mobile device to the vehicle, or (ii) refrain from generating or transmitting the at least one signal, or (iii) transition to the sleep mode.

7. The mobile device of claim 1, wherein:
    the information signal indicates at least one of a location of the mobile device or whether the mobile device is moving; and
    the control module is configured to, based on the information signal, at least one of reduce the polling rate of the mobile device, cease to indicate presence of the mobile device or transition to the sleep mode.

8. A system comprising:
    the mobile device of claim 1; and
    an access module implemented in the vehicle, wherein the access module is configured to
        receive the at least one signal and generates the instruction signal or the information signal,
        determine a location of the mobile device relative to the vehicle and whether the mobile device is moving, and
        generate the instruction signal or the information signal when the mobile device is within a predetermined distance of the vehicle and is not moving.

9. The mobile device of claim 1, wherein:
    the control module is configured to, based on the instruction signal or the information signal, reduce the polling rate of the mobile device; and
    the polling rate of the mobile device is a rate at which the mobile device transmits a presence signal or an advertisement signal to the vehicle.

10. The mobile device of claim 1, wherein the control module is configured to, when the mobile device is moving relative to the vehicle, transmit via the transceiver the at least one signal to the vehicle.

11. A system comprising:
    a transceiver configured to receive at least one signal from a mobile device indicating movement of the mobile device and indicating the mobile device being in a vicinity of a vehicle;
    an access module configured to, based on the at least one signal, determine a location of the mobile device relative to the vehicle and whether the mobile device is moving; and
    a polling reduction module configured to, when the mobile device is within a predetermined range of the vehicle and is not moving, generate an instruction signal or an information signal to cause the mobile device to at least one of reduce a polling rate of the mobile device, cease indicating presence of the mobile device or transition to a sleep mode.

12. The system of claim 11, wherein the polling reduction module is configured to generate the instruction signal to instruct the mobile device to at least one of reduce the polling rate of the mobile device, cease indicating presence of the mobile device or transition to the sleep mode.

13. The system of claim 11, wherein the polling reduction module is configured to generate the information signal to inform the mobile device of at least one of a location of the mobile device or whether the mobile device is moving to cause the mobile device to at least one of reduce the polling rate of the mobile device, cease indicating presence of the mobile device or transition to the sleep mode.

14. The system of claim 11, wherein:
    the transceiver is configured to receive ultra-wideband signals; and
    the access module is configured to, based on the ultra-wideband signals, determine the location of the mobile device including whether the mobile device is in or outside of one or more predefined zones relative to the vehicle.

15. The system of claim 11, the access module is configured to determine a received signal strength indicator value, and based on the received signal strength indicator value, determine the location of the mobile device and whether the mobile device is moving.

16. The system of claim 11, wherein the polling reduction module is configured to:
   determine whether the mobile device has been at a same location for greater than or equal to a predetermined period of time;
   when the mobile device has not been at the same location for greater than or equal to the predetermined period of time, generate the instruction signal to instruct the mobile device to reduce the polling rate or cease advertising presence of the mobile device; and
   when the mobile device has been at the same location for greater than or equal to the predetermined period of time, generate the instruction signal to instruct the mobile device to transition to the sleep mode.

17. The system of claim 11, wherein the access module is configured to determine whether the mobile device is moving away from the vehicle and outside the predetermined range, and when the mobile device is outside the predetermined range and moving away from the vehicle generate the instruction signal.

18. A method comprising:
   determining whether a mobile device is moving;
   when the mobile device is moving, transmitting from the mobile device at least one signal to a vehicle indicating movement by the mobile device and an indication of presence of the mobile device;
   receiving the at least one signal from the mobile device at an access module of the vehicle;
   based on the at least one signal, determining a location of the mobile device relative to the vehicle and whether the mobile device is moving; and
   when the mobile device is within a predetermined range of the vehicle and is not moving, generating an instruction signal to instruct the mobile device to at least one of reduce a polling rate of the mobile device, cease indicating presence of the mobile device or transition to a sleep mode.

19. The method of claim 18, further comprising:
   receiving the instruction signal from the access module at the mobile device; and
   based on the instruction signal, at least one of reducing the polling rate of the mobile device, ceasing advertising presence of the mobile device or transitioning to the sleep mode.

20. The method of claim 18, further comprising:
   receiving ultra-wideband signals; and
   based on the ultra-wideband signals, determining the location of the mobile device and whether the mobile device is moving.

21. The method of claim 18, further comprising:
   determining a received signal strength indicator value; and
   based on the received signal strength indicator value, determining the location of the mobile device and whether the mobile device is moving.

22. The method of claim 18, further comprising:
   determining whether the mobile device has been at a same location for greater than or equal to a predetermined period of time;
   when the mobile device has not been at the same location for greater than or equal to the predetermined period of time, generating the instruction signal to instruct the mobile device to reduce the polling rate or cease advertising; and
   when the mobile device has been at the same location for greater than or equal to the predetermined period of time, generating the instruction signal to instruct the mobile device to transition to the sleep mode.

* * * * *